US006992461B2

(12) United States Patent
Liang et al.

(10) Patent No.: US 6,992,461 B2
(45) Date of Patent: Jan. 31, 2006

(54) AUTOMOTIVE-USE CHARGER FLASHING LIGHT ARRAY

(76) Inventors: Hui-Hu Liang, No. 3 Pao Chi Lane, Chung Ya Tsun, Slu Shui Hsiang, Changhua Hsien (TW); Cheng-Taal Tang, No. 45, 130 Lane, Haiu Shan Road, Hsiu Shan Li, Hsi Chin City, Taipei Hsien (TW)

( * ) Notice: Subject to any disclaimer, the term of this patent is extended or adjusted under 35 U.S.C. 154(b) by 230 days.

(21) Appl. No.: 10/694,900

(22) Filed: Oct. 29, 2003

(65) Prior Publication Data

US 2005/0093509 A1 May 5, 2005

(51) Int. Cl.
*H02J 7/00* (2006.01)

(52) U.S. Cl. ....................................... 320/107; 320/114

(58) Field of Classification Search ................ 320/107, 320/114, 134, 132; 324/435
See application file for complete search history.

(56) References Cited

U.S. PATENT DOCUMENTS

| | | | | |
|---|---|---|---|---|
| 4,786,851 | A * | 11/1988 | Fuji et al. | 320/101 |
| 5,955,869 | A * | 9/1999 | Rathmann | 320/132 |
| 6,555,990 | B1 * | 4/2003 | Yang | 320/113 |
| 2003/0052651 | A1 * | 3/2003 | Crisp et al. | 320/164 |

* cited by examiner

*Primary Examiner*—Adolf Deneke Berhane
*Assistant Examiner*—Aaron Piggush
(74) *Attorney, Agent, or Firm*—Troxell Law Office, PLLC

(57) ABSTRACT

An automotive charger flashing light array consisting of a plurality of light emitting diodes (LEDs) disposed on a charger. The LEDs are connected to a programmable integrated circuit in a charging circuit such that when the automotive charger is recharging a mobile telephone battery, the programmable integrated circuit outputs control signals that cause the plurality of LEDs to illuminate in various sequences to indicate the state of charging, while also increasing the added value of the automotive charger.

2 Claims, 2 Drawing Sheets

AUTOMOTIVE-USE CHARGER FLASHING LIGHT ARRAY

BACKGROUND OF THE INVENTION

1) Field of the Invention

The invention herein relates to automobile accessories, specifically an automotive-use charger flashing light array wherein a programmable integrated circuit is utilized in a charging circuit for controlling the illumination sequence of a plurality of light emitting diodes (LEDs) to enhance indicating performance and added value.

2) Description of the Prior Art

In a conventional automotive charger, the indicator lights are typically LEDs that are disposed at the power input terminal of the charger and only indicate the presence of direct current.

SUMMARY OF THE INVENTION

I. Unsolved Problems

1. The indicator lights in a conventional automotive charger communicate that power is being furnished but are incapable of clearly conveying to the user whether charging is finished.
2. To handle the said problem, two-color LEDs are utilized, the color changing characteristic allowing the user to distinguish between power and charging status. However, the said two-color discernment is uninteresting and fails to draw the full attention of the user; when charging is completed, the said two-color LEDs immediately change color and if the user is not watching, the completion of charging often goes unnoticed.

II. Means of Solution

1. The automotive-use charger of the invention herein consists of a charging circuit in which is connected a programmable integrated circuit connected as well as a plurality of LEDs installed on an automotive charger such that as charging occurs, the illumination sequence of the said LEDs are controlled, increasing state of charge noticeability and enhancing the added value of the said automotive charger.
2. The plurality of LEDs of the invention herein are displayed in an operating sequence similar to that of horse race starting gate lights as charging occurs to keep the user informed of the charging progress at all times and, furthermore, one LED remains illuminated when charging is finished to indicate power status.

DETAILED DESCRIPTION OF THE INVENTION

The invention herein is an automotive-use charger flashing light array, the embodiment of which is elaborated below.

Figure 1:
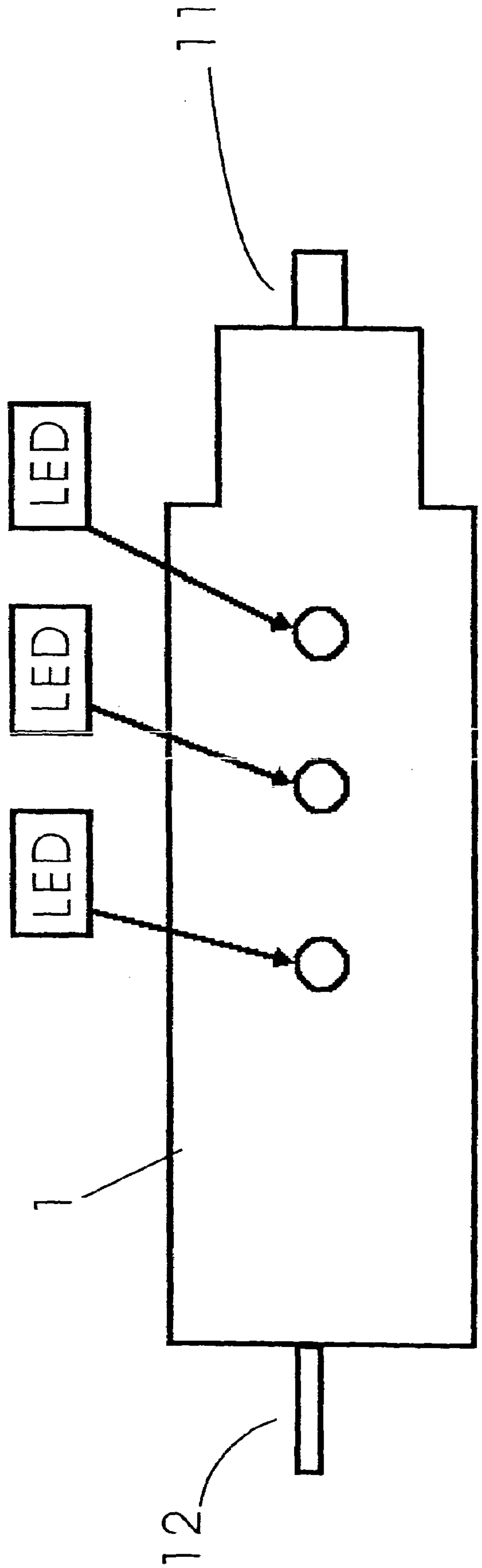
FIG. 1 is an orthographic drawing of the automotive-use charger layout of the invention herein.

Referring to FIG. 1, the said automotive charger 1 has a power supply input terminal 11 at one side and a power supply output terminal 12 at the opposite side, with the said power supply input terminal 11 inserted into an automotive-use socket (not shown in the drawings); a plurality of light emitting diodes (LEDs) are disposed on the said automotive charger 1 that provides for sequential indication during battery charging.

Figure 2:
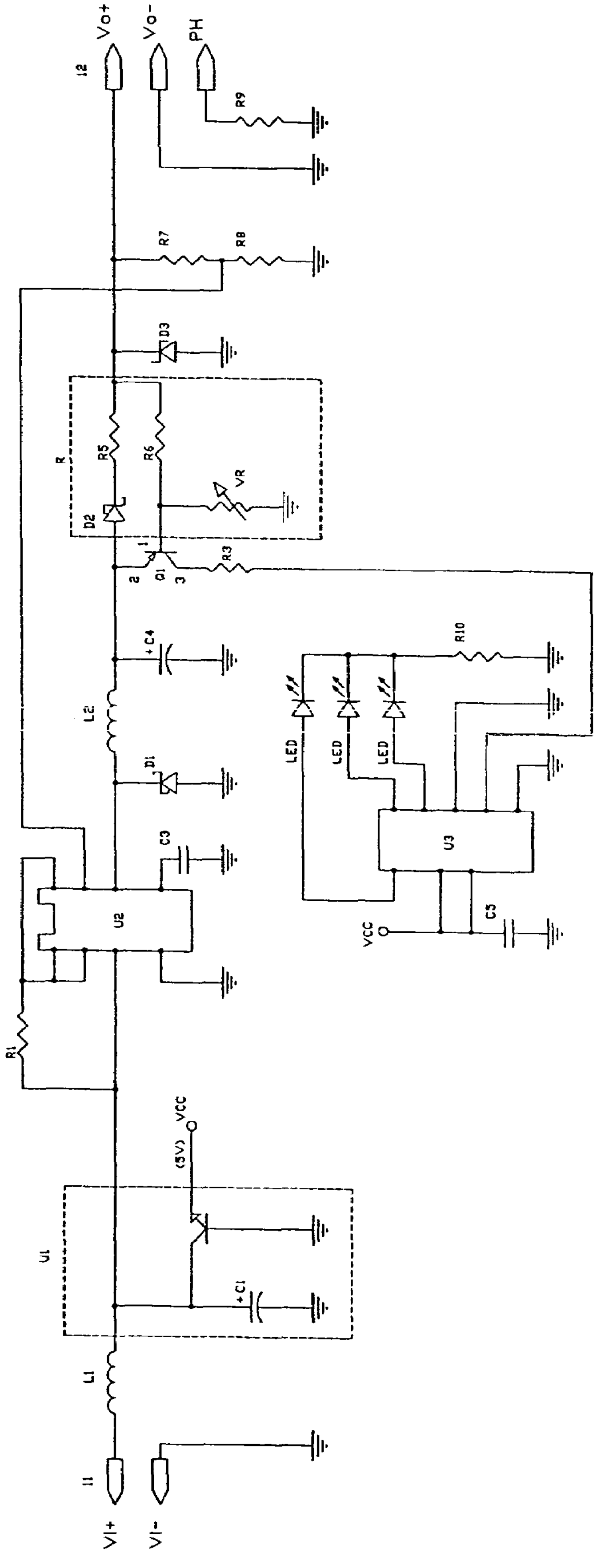
FIG. 2 is a schematic diagram of the automotive-use charger of the invention herein.

Referring to FIG. 2, the said plurality of LEDs are respectively connected to the data output pins of a programmable integrated circuit U3 and the said input terminal is connected to the collector output lead of a transistor Q1.

The base input lead of the said transistor Q1 is connected to a parallel resistance circuit R, following which it is connected to the direct current power output terminal 12 of the automotive charger 1.

The emitter input lead of the said transistor Q1 is respectively connected to the output pin of a voltage stabilizing integrated circuit U2 and the parallel resistance circuit R.

The said voltage stabilizing integrated circuit U2 input pin is connected to a wave filtering circuit U1 and the power supply input terminal 11.

As such, the direct current power supply 11 flows through the wave filtering circuit U1, the voltage stabilizing integrated circuit U2 outputs a charging current, and the battery is charged from the direct current power supply output terminal 12; from the said charging current, the parallel resistance circuit R produces the bias voltage required by the programmable integrated circuit U3 to establish continuity such that the transistor Q1 collector outputs a signal capable of controlling the operation of the programmable integrated circuit U3, causing the sequential illumination of the LEDs; when the battery reaches the fully charged state, the parallel resistance circuit R lowers the voltage, terminating continuity with the transistor Q1 to stop data output from the transistor Q1, the programmable integrated circuit U3 then outputs signals, one of which maintains LED illumination but halts sequential LED operation to indicate the completion of the charging cycle and, furthermore, continues displaying direct current status.

The said programmable integrated circuit U3 defines and controls numerous LCD illumination sequences to effectively enhance sensory perceptivity.

A voltage regulator VR is shunted between the said parallel resistance circuit R and the base of the transistor Q1 and ground to vary control over the continuity cutoff timing of the transistor Q1, which in conjunction with the resistance value of the parallel resistance circuit R adaptively adjusts the amount of charging current necessary and, furthermore, enables control over the said plurality of LEDs such that they illuminate in a range of numerous differing sequences defined by the programmable integrated circuit U3.

What is claimed is:

1. An automotive charger flashing light array comprised of an automotive charger and a charging circuit, wherein the said charging circuit consists of a wave filtering circuit, a voltage stabilizing integrated circuit, and an outputted charging current, the features of which are:

a plurality of light emitting diodes (LEDs) are disposed on the said automotive charger that are illuminated in a range of numerous different sequences defined by a programmable integrated circuit;

a transistor, the collector output lead of which is connected to the input pin of the said programmable integrated circuit, with its base connected to the output terminal of a parallel resistance circuit and its emitter connected to the output pin of the said voltage stabilizing integrated circuit as well as the input terminal of the said parallel resistance circuit;

as such, a bias voltage sourced from the said parallel resistance circuit causes continuity with the said transistor to control the operation of the said programmable integrated circuit to provide for the differing illumination sequences required of the said plurality of LEDs as defined by the said programmable integrated circuit; when the battery is fully charged, the said parallel resistance circuit lowers the charging current, causing a drop in the conducted bias voltage of the said transistor that stops data output such that LED illumination is only maintained to indicate power ON status.

2. An automotive charger flashing light array as claimed in claim 1 in which the said parallel resistance circuit and the base of the said transistor are shunted to ground by a voltage regulator to vary control over the continuity cutoff timing of the said transistor and thereby provide the appropriate amount of current needed for charging.

* * * * *